Aug. 26, 1958 B. JAFFE ET AL 2,849,404

MORPHOTROPIC PIEZOELECTRIC CERAMICS

Filed April 13, 1956 2 Sheets-Sheet 1

INVENTORS
Bernard Jaffe
Robert S. Roth
Samuel Marzullo

BY W. E. Thibodeau, A. W. Dew & J. D. Edgerton
ATTORNEYS

| NO. | COMPOSITION MOLE % | | | | CRYSTAL | ϵ | CURIE POINT °C | TEMPERATURE | | | | | | | | | | | |
|---|---|---|---|---|---|---|---|---|---|---|---|---|---|---|---|---|---|---|---|
| | | | | | | | | 25°C | | | | 100°C | | | | 175°C | | | |
| | $PbTiO_3$ | PbO: $SnO_2$ | $PbZrO_3$ | $PbHfO_3$ | | | | f.c. | $k_r$ | $d_{31}$ | $g_{31}$ | f.c. | $k_r$ | $d_{31}$ | $g_{31}$ | f.c. | $k_r$ | $d_{31}$ | $g_{31}$ |
| 15 | 45 | 55 | — | — | T | 1200 | 235 | 1152 | .25 | 46 | 5.1 | 1149 | .24 | 55 | 3.5 | 1183 | .17 | 58 | 1.6 |
| 16 | 40 | 60 | — | — | PC | 723 | 225 | 1171 | .20 | 28 | 5.0 | 1140 | .21 | 45 | 3.6 | 1195 | .12 | 44 | 1.2 |
| 34 | 48 | 20 | 32 | — | T | 956 | 300 | 1128 | .39 | 72 | 9.2 | 1118 | .38 | 82 | 7.5 | 1140 | .34 | 87 | 5.4 |
| 35 | 46 | 20 | 34 | — | R | 808 | 270 | 1139 | .38 | 61 | 9.5 | 1120 | .38 | 75 | 8.1 | 1119 | .36 | 88 | 6.1 |
| 53 | 46.5 | 40 | 13.5 | — | T | 948 | 250 | 1106 | .36 | 63 | 8.2 | 1111 | .34 | 75 | 6.7 | 1132 | .29 | 75 | 4.8 |
| 54 | 45 | 40 | 15 | — | R | 898 | 270 | 1098 | .36 | 61 | 8.9 | 1089 | .35 | 72 | 7.1 | 1104 | .31 | 83 | 4.6 |
| 69 | 52.5 | — | — | 47.5 | T | 761 | 350 | 1110 | .37 | 59 | 8.8 | 1108 | .36 | 66 | 7.7 | 1125 | .33 | 74 | 5.4 |
| 70 | 50 | — | — | 50 | R | 676 | 330 | 1111 | .38 | 54 | 10.3 | 1089 | .38 | 66 | 9.1 | 1086 | .36 | 80 | 7.1 |
| 14¼ | 51.75 | 10 | — | 38.25 | U | 750 | 295 | 1140 | .38 | 58 | 9.5 | 1127 | .38 | 69 | 8.0 | 1131 | .35 | 79 | 6.0 |
| 14¾ | 47.25 | 10 | — | 42.75 | R | 630 | 290 | 1168 | .34 | 46 | 8.9 | 1155 | .34 | 55 | 7.6 | 1150 | .33 | 65 | 5.9 |
| 24½ | 46 | 20 | — | 34 | R | 670 | 260 | 1163 | .33 | 47 | 8.6 | 1149 | .34 | 59 | 7.4 | 1144 | .31 | 71 | 4.9 |

T—TETRAGONAL CRYSTAL SYMMETRY
PC—PSEUDO-CUBIC CRYSTAL SYMMETRY
R—RHOMBOHEDRAL CRYSTAL SYMMETRY
ϵ—DIELECTRIC CONSTANT—DIMENSIONLESS
f.c.—FREQUENCY CONSTANT (RADIAL RESONANCE FREQUENCY MULTIPLIED BY DISC RADIUS)—CYCLE-METERS
$k_r$—RADIAL COUPLING COEFFICIENT—DIMENSIONLESS
$d_{31}$—TRANSVERSE PIEZOELECTRIC CHARGE CONSTANT—COULOMBS/NEWTON $\times 10^{-12}$
$g_{31}$—TRANSVERSE PIEZOELECTRIC POTENTIAL CONSTANT—METER-VOLT/NEWTON $\times 10^{-3}$
ALL VALUES AT 25° C AND 1 MEGACYCLE UNLESS OTHERWISE INDICATED.

U - APPARENTLY TETRAGONAL CRYSTAL SYMMETRY

FIG. 5.

INVENTORS
Bernard Jaffe
Robert S. Roth
Samuel Marzullo
BY
W. E. Thibodeau, A. W. Dew & J. D. Edgerton
ATTORNEYS.

United States Patent Office 2,849,404

Patented Aug. 26, 1958

2,849,404

MORPHOTROPIC PIEZOELECTRIC CERAMICS

Bernard Jaffe, South Euclid, Ohio, Robert S. Roth, Silver Spring, Md., and Samuel Marzullo, Washington, D. C., assignors to the United States of America as represented by the Secretary of the Army Application April 13, 1956, Serial No. 578,157

6 Claims. (Cl. 252—62.9)

(Granted under Title 35, U. S. Code (1952), sec. 266)

The invention described herein may be manufactured and used by or for the Government for governmental purposes without payment to us of any royalty thereon.

This invention relates to ceramic piezoelectric transducers and more particularly to transducers comprising a solid solution of lead titanate, lead stannate, and either lead zirconate or lead hafnate, proximate the morphotropic phase boundary.

Piezoelectric ceramic transducers can be fabricated in a wide variety of shapes and sizes. Like other ceramics fired at high temperatures, they are generally nonreactive at ordinary temperatures. In contrast, crystal transducers must be formed by lapidary techniques from nearly-perfect single crystals. Many of the commonly-used ones are water-soluble; others dehydrate easily when heated.

An object of this invention is to provide ceramic compositions suitable for use as electromechanical transducers over a wide temperature interval.

Other objects are to provide electromechanical transducers with a high dielectric constant; high Curie point; high radial coupling coefficient; high piezoelectric charge and potential constants; and stable frequency constant.

The specific nature of the invention as well as other objects, uses, and advantages thereof will clearly appear from the following description and from the accompanying drawing, in which:

Fig. 5 is a table giving values of results from eleven ceramic solid solutions proximate the morphotropic phase boundaries.

Figure 1:
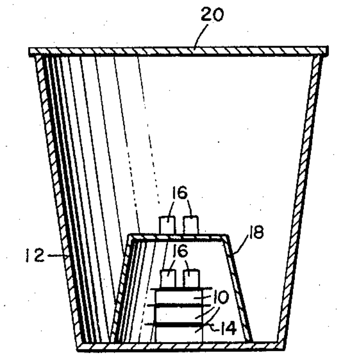
Fig. 1 is a cross-sectional view of a crucible used to mature ceramics according to this invention.

To meet the objects of this invention it is necessary that the crystal structure of the material be devoid of a center of symmetry. However, it must also be possible to orient permanently the crystallographic directions of the component grains by an externally applied field.

The only known piezoelectric ceramics are made from ferroelectric crystalline materials. These are regarded as ones having a crystal structure which contains a dipole mobile enough to orient itself parallel to its neighbors in adjacent unit cells, and to be reversible by an applied electric field.

In polycrystalline form, the ferroelectric compounds differ in their ability to acquire and retain a piezoelectric effect, even though each would show strong piezoelectricity if a single-domain crystal of it were tested. Barium titanate, widely used as a ceramic transducer, is an example of a ceramic capable of retaining a strong piezoelectric effect. This and most other ferroelectric ceramic compounds have a distorted perovskite type structure, $ABO_3$, in which the A ions occupy the corners and the B ions occupy the center position of the unit cell, with the oxygen ions at the center of the faces. Most ferroelectric compounds have either rhombohedral, tetragonal, or orthorhombic symmetry. Solid-solution series between known ferroelectrics and other materials related in structure can yield ceramic transducer materials of promise.

The piezoelectric properties and the dielectric constant of ferroelectric barium titanate are enhanced at temperatures near those of polymorphic inversions below the Curie temperature, such as near 0° C. At these inversion temperatures, the crystal form changes from one ferroelectric modification of the perovskite structure to another. Compositional boundaries, substantially independent of temperature below the Curie point, also exist between ferroelectric phases of slightly differing structure. Such an abrupt change in the structure of a solid solution with variation in composition is known as a morphotropic transformation. These morphotropic transformations occur because of free energy differences between two or more alternate crystallographic modifications of a given basic structure type. As one ion replaces another in a solid solution, the energies of the different structures change, and the crystal assumes the structure having the minimum free energy.

One example of morphotropism between ferroelectric phases in solid solution is found in the system lead zirconate-lead titanate, described in Jaffe's U. S. Patent No. 2,708,244.

*Preparation*

The materials used to prepare the ceramics of this invention include reagent-grade lead oxide, a high-purity hydrated tin oxide, a commercially-pure grade of zirconium oxide, a good commercial dielectric grade of titanium oxide, and a grade of hafnium oxide which contains about 0.7% by weight of iron oxide and some titanate, for which allowance must be made in computing the batches. Batches are ball-milled with distilled water for intimate mixing, dried under infrared, and mixed again in a mortar. Generally they are pressed loosely into a pellet and calcined at 800° C. for ½ hr. in a covered platinum crucible. The calcined pellet is then ground thoroughly, a few drops of distilled water added (organic binders should be avoided), and pressed at 15,000 lb./in.$^2$ in the form of discs. These discs are heat treated at about 1225° C. for a period of time ranging from 30 min. to 60 min. The temperature rise rate of 4.5° C. per min. is maintained and the naturally rapid cooling is allowed. Three tests of maturity are used—absorption of carbon tetrachloride, linear shrinkage, and apparent density.

Difficulty is experienced maturing discs with a highly-pure grade of hafnium oxide. This may indicate certain impurities are necessary or that a higher temperature should be used with lead hafnate containing ceramics.

As lead oxide in lead zirconate and its solid-solutions is volatile, its loss is controlled by firing the specimens in an atmosphere that contains lead oxide vapor, as shown in Fig. 1. The discs 10 are placed in the bottom of large platinum crucible 12, separated by platinum foil 14. One or two atmosphere pellets 16 are place on the top of the discs. These atmosphere pellets are composed of lead oxide and zirconium oxide enriched in lead oxide over the 1:1 molar ratio by 4 weight percent. Small platinum crucible 18 is inverted over the discs 10 and pellets 16. Additional pellets 16 are placed on top of the small crucible as shown. The large crucible 12 is closed by platinum cover 20. Platinum was used because lead oxide vapor attacks many common materials.

Ceramic crucibles that withstand high temperatures and the lead oxide atmosphere could be used. By this method the discs may either gain or lose weight, according to the amount of lead oxide vapor present. The samples are weighed before and after firing so that the atmosphere may be controlled to a point that the weight remains unchanged during firing.

Silver paste is fired on the disc faces to form electrodes in a conventional manner. The discs are polarized while immersed in a dielectric medium of clean carbon tetrachloride at room temperature. A voltage gradient of 150 volts per mil is maintained for 1 hr., except in some cases a lower voltage must be used because of excessive sparking or electrical leakage.

*Properties*

Figure 2:
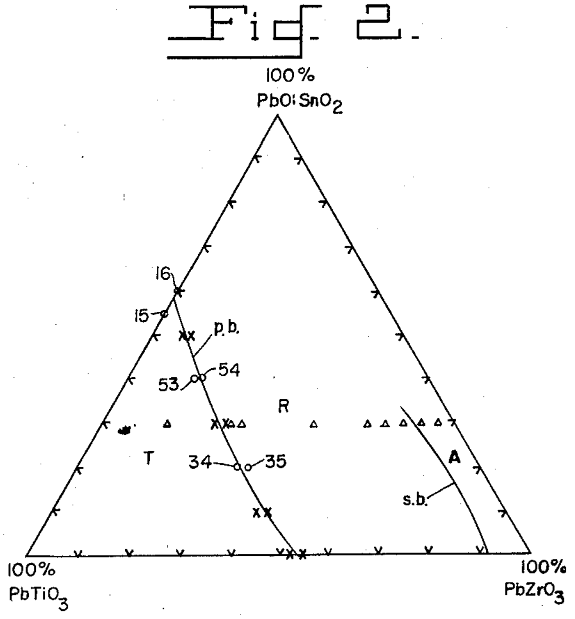
Fig. 2 is a graph showing the morphotropic phase boundary of a ceramic comprising a solid solution of lead titanate, lead stannate, and lead zirconate.
Figures 3, 4:
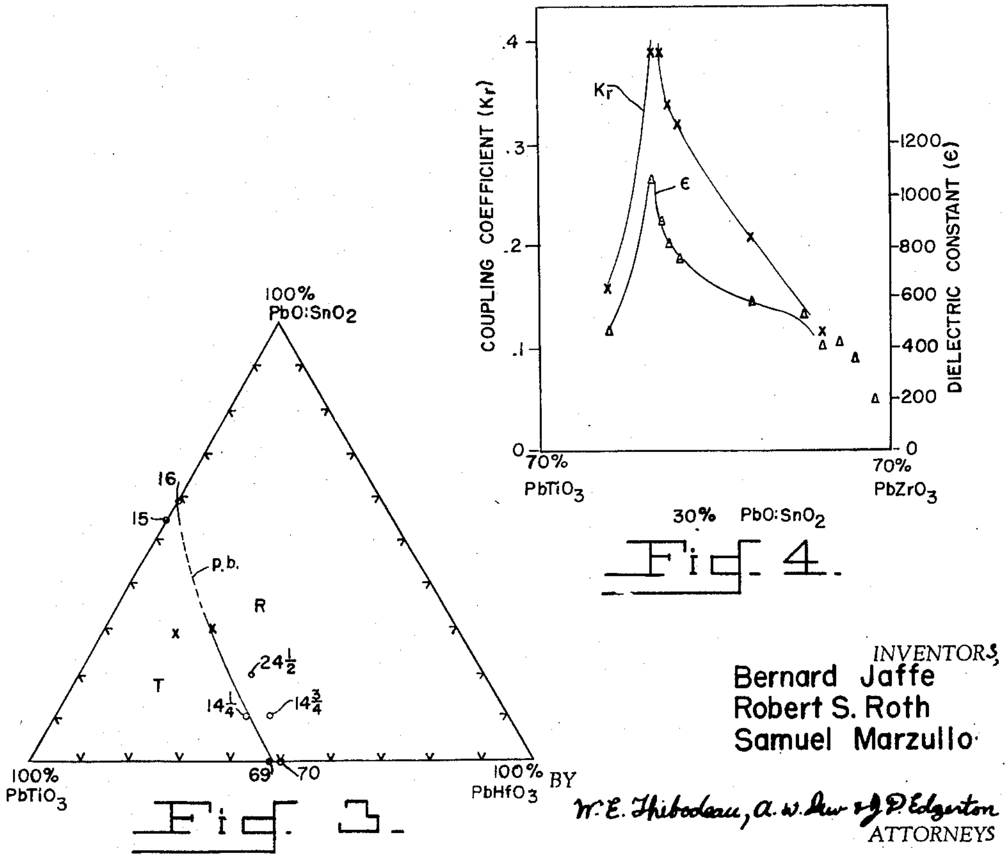
Fig. 3 is a graph showing the morphotropic phase boundary of a ceramic comprising a solid solution of lead titanate, lead stannate, a lead hafnate.
Fig. 4 is a graph showing the increase of the dielectric constant and radial coupling coefficient as the phase boundary is approached in a solid solution of lead titanate, lead stannate, and lead zirconate.

After firing, X-ray diffraction patterns may be obtained with a Geiger-counter type X-ray diffractometer using $Cu_{K_\alpha}$ radiation. From such tests the phase boundaries shown in Figs. 2 and 3 are determined. As seen in Fig. 2, for a solid solution of lead titanate, lead stannate, and lead zirconate the line *pb* divides the phase T of ferroelectric, tetragonal symmetry from the phase R of ferroelectric, rhombohedral symmetry. Also shown is secondary boundary *sb* which divides phase R from phase A of anti-ferroelectric composition. This boundary is not of interest to this invention. The composition of batches 15, 16, 34, 35, 53 and 54 are shown by circles in Fig. 2 and their properties listed in the table of Fig. 5. Other compositions are indicated by X; their properties are listed in our report, Journal of Research of the National Bureau of Standards, November 1955, vol. 55, No. 5, pp. 239–254.

In like manner, Fig. 3 is for a solid solution of lead titanate, lead stannate and lead hafnate. Again the line *pb* divides phase T of ferroelectric tetragonal symmetry from phase R of ferroelectric rhombohedral symmetry. The composition of batches 15, 16, 69, 70, 14¼, 14¾ and 24½ are shown in this figure.

Fig. 4 is a representation of how the radial coupling coefficient and dielectric constant reach maximum values in the vicinity of or proximate the phase boundary. It is taken for a lead titanate, lead stannate, lead zirconate solid solution, along a line of 30 mole percent of lead stannate. It is typical of the values obtained for any system as the morphotropic phase boundary is approached and crossed.

Good values for the properties are particularly noticed within about 10 mole percent of the morphotropic phase boundary. For example, with the solid solution shown in Fig. 4 in which the morphotropic phase boundary is approximately at 46.5 mole percent lead titanate, 23.5 mole percent lead zirconate, and 30 mole percent lead stannate; improvement of the properties is particularly noticed in the region of about 36.5 to 56.5 mole percent lead titanate as the boundary is approached.

Thus it may be seen that proximate or in the vicinity of the morphotropic phase boundary the dielectric and piezoelectric properties of solid solutions of ferroelectric ceramic compounds are at a maximum throughout a wide range of temperatures below the Curie point. Different compositions give different values of the various properties, but in each case the maximum values of the particular property of interest is found proximate the morphotropic phase boundary.

Although the term lead stannate is used, it will be understood that we are speaking of a mixture of lead oxide and tin oxide in 1:1 mole proportion. The equimolar combination of these oxides can enter a solid solution even through there is reason to believe that they do not combine directly with one another to yield a perovskite type $PbSnO_3$.

It will be apparent that the embodiments shown are only exemplary and that various modifications can be made in construction, materials, and arrangement within the scope of the invention as defined in the appended claims.

We claim:

1. A piezoelectric ceramic composition comprising a solid solution consisting of the compounds of: lead titanate and lead stannate within about 10 mole percent of the morphotropic phase boundary, said boundary being approximately at 58 mole percent lead stannate—42 mole percent lead titanate.

2. A piezoelectric ceramic composition comprising a solid solution consisting of the compounds of: lead titanate and lead hafnate within about 10 mole percent of the morphotropic phase boundary, said boundary being at approximately 48 mole percent lead hafnate—52 mole percent lead titanate.

3. A piezoelectric ceramic composition comprising a solid solution consisting of the compounds of: lead titanate, lead stannate, and lead zirconate, said compounds having proportions such that if the proportion of one of said compounds were considered fixed, the proportions of the remaining two compounds would be within about 10 mole percent of the morphotropic phase boundary of said solid solution, said boundary being approximately determined by the smooth curve drawn through the points of four boundary compositions on a composition diagram of the ternary system lead stannate—lead titanate—lead zirconate, said four boundary compositions being substantially as follows: 58 mole percent lead stannate—42 mole percent lead titanate, 40 mole percent lead stannate—45 mole percent lead titanate—15 mole percent lead zirconate, 20 mol percent lead stannate—48 mole percent lead titanate—32 mole percent lead zirconate, and 46 mole percent lead titanate—54 mole percent lead zirconate.

4. A piezoelectric ceramic composition comprising a solid solution consisting of the compounds of: lead titanate, lead zirconate, and substantially 30 mole percent of lead stannate, the remaining proportions of lead titanate and lead zirconate being within about 10 mole percent of the morphotropic phase boundary, said boundary being approximately at 46.5 mole percent lead titanate—23.5 mole percent lead zirconate—30 mole percent lead stannate.

5. A piezoelectric ceramic composition comprising a solid solution consisting of: lead titanate, lead stannate, and lead hafnate, said compounds having proportions such that if the proportion of one of said compounds were considered fixed, the proportions of the remaining two compounds would be within about 10 mole percent of the morphotropic phase boundary of said solid solution, said boundary being approximately determined by the smooth curve drawn through the points of three boundary compositions on a composition diagram of the ternary system lead stannate—lead titanate—lead hafnate, said three boundary compositions being substantially as follows: 58 mole percent lead stannate—42 mole percent lead titanate, 10 mole percent lead stannate—52 mole percent lead titanate—38 mole percent lead hafnate, and 52 mole percent lead titanate—48 mole percent lead hafnate.

6. A piezoelectric ceramic composition comprising a solid solution consisting of the compounds of: lead titanate, lead hafnate, and substantially 10 mole percent of lead stannate, the remaining proportions of lead titanate being within about 10 mole percent of the morphotropic phase boundary, said boundary being approximately at 52 mole percent lead titanate—38 mole percent lead hafnate—10 mole percent lead stannate.

References Cited in the file of this patent

UNITED STATES PATENTS 2,624,709 Coffeen ---------------- Jan. 6, 1953
2,708,244 Jaffe ------------------ May 10, 1955